(12) United States Patent
Casparian et al.

(10) Patent No.: US 8,700,829 B2
(45) Date of Patent: Apr. 15, 2014

(54) SYSTEMS AND METHODS FOR IMPLEMENTING A MULTI-FUNCTION MODE FOR PRESSURE SENSITIVE SENSORS AND KEYBOARDS

(75) Inventors: Mark A. Casparian, Miami, FL (US); Carlos Ross, Miami, FL (US); Danae Sierra, Miami, FL (US); Karun Reddy, Round Rock, TX (US); Larry E. Knepper, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 192 days.

(21) Appl. No.: 13/232,707

(22) Filed: Sep. 14, 2011

(65) Prior Publication Data
US 2013/0067126 A1    Mar. 14, 2013

(51) Int. Cl.
| | |
|---|---|
| G06F 3/02 | (2006.01) |
| H03K 17/94 | (2006.01) |
| G06F 3/00 | (2006.01) |
| G06F 13/12 | (2006.01) |
| G06F 3/023 | (2006.01) |

(52) U.S. Cl.
CPC .............. *G06F 3/0219* (2013.01); *G06F 3/023* (2013.01); *G06F 3/0238* (2013.01)
USPC ................. 710/67; 341/20; 341/34; 345/172; 708/145

(58) Field of Classification Search
None
See application file for complete search history.

(56) References Cited

U.S. PATENT DOCUMENTS

| | | |
|---|---|---|
| 3,936,674 A | 2/1976 | Hughes |
| 4,302,011 A | 11/1981 | Pepper, Jr. |
| 4,334,134 A | 6/1982 | Janda |
| 4,449,024 A | 5/1984 | Stracener |
| 4,527,250 A | 7/1985 | Galdun et al. |
| 4,896,069 A | 1/1990 | Rosenberg et al. |
| 4,899,631 A | 2/1990 | Baker |
| 5,252,798 A | 10/1993 | Kamada |
| 5,285,037 A | 2/1994 | Baranski et al. |
| 5,408,060 A | 4/1995 | Muurinen |
| 5,434,566 A | 7/1995 | Iwasa et al. |
| 5,450,078 A | 9/1995 | Silva et al. |
| 5,909,211 A | 6/1999 | Combs et al. |
| 6,007,209 A | 12/1999 | Pelka |
| 6,102,802 A | 8/2000 | Armstrong |

(Continued)

OTHER PUBLICATIONS

Casparian et al., "Systems and Methods for Implementing Pressure Sensitive Keyboards", U.S. Appl. No. 12/802,468, Amendment, Jan. 23, 2013, 17 pgs.

(Continued)

*Primary Examiner* — Idriss N Alrobaye
*Assistant Examiner* — Richard B Franklin
(74) *Attorney, Agent, or Firm* — Egan, Peterman & Enders LLP.

(57) ABSTRACT

Systems and methods are disclosed herein for implementing one or more individual pressure sensitive keys that each support multiple native scan codes, with each scan code corresponding to a unique pressure level output. The disclosed systems and methods may be implemented in one exemplary embodiment to allow users to leverage the capability of a variable pressure keyboard by providing an information handling system having individual variable pressure keys that are each capable of outputting a different macro or multi-key sequence per key pressure level sensed.

31 Claims, 5 Drawing Sheets

(56) References Cited

U.S. PATENT DOCUMENTS

| | | | |
|---|---|---|---|
| 6,135,886 | A | 10/2000 | Armstrong |
| 6,275,138 | B1 | 8/2001 | Maeda |
| 6,559,399 | B2 | 5/2003 | Hsu et al. |
| 6,608,271 | B2 | 8/2003 | Duarte |
| 6,684,166 | B2 | 1/2004 | Bellwood et al. |
| 6,747,867 | B2 | 6/2004 | Hsu |
| 6,758,615 | B2 | 7/2004 | Monney et al. |
| 6,860,612 | B2 | 3/2005 | Chiang et al. |
| 6,883,985 | B2 | 4/2005 | Roberson |
| 6,918,677 | B2 | 7/2005 | Shipman |
| 7,106,305 | B2 | 9/2006 | Rosenberg |
| 7,123,241 | B2 | 10/2006 | Bathiche |
| 7,244,898 | B2 | 7/2007 | Kim |
| 7,256,768 | B2 | 8/2007 | Bathiche |
| 7,335,844 | B2 | 2/2008 | Lee et al. |
| 7,394,033 | B2 | 7/2008 | Kim |
| 7,655,901 | B2 | 2/2010 | Idzik et al. |
| 7,667,371 | B2 | 2/2010 | Sadler et al. |
| 7,688,310 | B2 | 3/2010 | Rosenberg |
| 7,741,979 | B2 | 6/2010 | Schlosser et al. |
| 7,772,987 | B2 | 8/2010 | Shows |
| 7,786,395 | B2 | 8/2010 | Ozias et al. |
| 8,159,461 | B2 | 4/2012 | Martin et al. |
| 8,217,892 | B2 | 7/2012 | Meadors |
| 8,224,391 | B2 | 7/2012 | Kim et al. |
| 8,307,222 | B2 | 11/2012 | Wang et al. |
| 8,411,029 | B2 | 4/2013 | Casparian et al. |
| 8,502,094 | B2 | 8/2013 | Chen |
| 2002/0084721 | A1 | 7/2002 | Walczak |
| 2003/0072595 | A1 | 4/2003 | Al-Safar |
| 2003/0210233 | A1 | 11/2003 | Frulla |
| 2004/0027385 | A1 | 2/2004 | Rekimoto et al. |
| 2004/0174200 | A1 | 9/2004 | McNutt |
| 2004/0183783 | A1 | 9/2004 | Rojas et al. |
| 2005/0057514 | A1 | 3/2005 | Bathiche |
| 2005/0057515 | A1 | 3/2005 | Bathiche |
| 2005/0073446 | A1 | 4/2005 | Lazaridis et al. |
| 2006/0022951 | A1 | 2/2006 | Hull |
| 2006/0148564 | A1 | 7/2006 | Herkelman |
| 2006/0277466 | A1 | 12/2006 | Anderson |
| 2007/0065215 | A1 | 3/2007 | Brown |
| 2007/0227256 | A1 | 10/2007 | Wright |
| 2007/0235307 | A1 | 10/2007 | Liao et al. |
| 2007/0285393 | A1 | 12/2007 | Ishakov |
| 2008/0092087 | A1 | 4/2008 | Brown et al. |
| 2008/0179172 | A1 | 7/2008 | Sellers |
| 2008/0251364 | A1 | 10/2008 | Takala et al. |
| 2009/0007758 | A1 | 1/2009 | Schlosser et al. |
| 2009/0079612 | A1 | 3/2009 | Parfitt |
| 2009/0127084 | A1 | 5/2009 | Ozias et al. |
| 2009/0140985 | A1 | 6/2009 | Liu |
| 2009/0178913 | A1 | 7/2009 | Peterson et al. |
| 2009/0189790 | A1 | 7/2009 | Peterson et al. |
| 2009/0189873 | A1 | 7/2009 | Peterson et al. |
| 2009/0207055 | A1* | 8/2009 | Aull et al. ............ 341/34 |
| 2010/0027854 | A1 | 2/2010 | Chatterjee et al. |
| 2010/0089735 | A1 | 4/2010 | Takeda et al. |
| 2010/0090813 | A1 | 4/2010 | Je et al. |
| 2010/0090814 | A1 | 4/2010 | Cybart et al. |
| 2010/0090957 | A1 | 4/2010 | Idzik et al. |
| 2010/0117809 | A1 | 5/2010 | Dai et al. |
| 2010/0148999 | A1 | 6/2010 | Casparian et al. |
| 2010/0182241 | A1 | 7/2010 | Rosenberg |
| 2010/0205803 | A1 | 8/2010 | Lipton et al. |
| 2010/0253552 | A1 | 10/2010 | Mendez et al. |
| 2010/0288607 | A1 | 11/2010 | Ozias et al. |
| 2010/0321301 | A1 | 12/2010 | Casparian et al. |
| 2011/0078470 | A1 | 3/2011 | Wang et al. |
| 2011/0095877 | A1 | 4/2011 | Casparian et al. |
| 2011/0102325 | A1 | 5/2011 | Sato et al. |
| 2011/0102326 | A1 | 5/2011 | Casparian et al. |
| 2011/0102340 | A1 | 5/2011 | Martin et al. |
| 2012/0298491 | A1 | 11/2012 | Ozias et al. |
| 2013/0100028 | A1 | 4/2013 | Mahowald et al. |
| 2013/0178292 | A1 | 7/2013 | Casparian et al. |

OTHER PUBLICATIONS

Casparian et al., "Systems and Methods for Implementing Pressure Sensitive Keyboards", U.S. Appl. No. 12/802,468, Final Office Action, Apr. 9, 2013, 21 pgs.

Casparian et al., Keyboard With User Configurable Granularity Scales for Pressure Sensitive Keys, U.S. Appl. No. 12/316,703, Final Office Action, Aug. 2, 2012; 22 pgs.

Texas Instruments, "MSP430 Capacitive Single-Touch Sensor Design Guide", Application report, SLAA379, Jan. 2008, 19 pgs.

Cypress Semiconductor Corporation, Cypress Perform, "CY8C21634, CY8C21534, CY8C21434, CY8C21334, CY8C2123; PSoC® Mixed-Signal Array," Apr. 18, 2008, Document No. 38-12025 Rev. M, 43 pgs.

Logitech, "Logitech Gaming Keyboard G510", Printed from Internet Aug. 25, 2011, 3 pgs.

Saitek, "Saitek Pro Gamer Command Unit", Feb. 27, 2011, 7 pgs.

Saitek, "Saitek Pro Gamer Command Unit", Dec. 6, 2005, 41 pgs.

Casparian et al., Keyboard With User Configurable Granularity Scales for Pressure Sensitive Keys, U.S. Appl. No. 12/316,703, Office Action, Feb. 27, 2012; 13 pgs.

Casparian et al., "Systems and Methods for Implementing Haptics for Pressure Sensitive Keyboards", U.S. Appl. No. 12/930,125, Amendment, Mar. 1, 2013, 26 pgs.

Casparian et al., "Systems and Methods for Implementing Haptics for Pressure Sensitive Keyboards", U.S. Appl. No. 12/930,125, Advisory Action, Apr. 3, 2013, 9 pgs.

Casparian et al., Keyboard With User Configurable Granularity Scales for Pressure Sensitive Keys, U.S. Appl. No. 12/316,703, Response, May 29, 2012; 15 pgs.

Casparian et al., "Systems and Methods for Implementing Pressure Sensitive Keyboards", U.S. Appl. No. 12/802,468, Response to Final Office Action, Jun. 10, 2013, 13 pgs.

Casparian et al., "Systems and Methods for Implementing Pressure Sensitive Keyboards", U.S. Appl. No. 12/802,468, Advisory Action, Jul. 11, 2013, 7 pgs.

Casparian et al., "Systems and Methods for Implementing Pressure Sensitive Keyboards", U.S. Appl. No. 12/802,468, Office Action, Oct. 23, 2012; 14 pgs.

Casparian et al., "Keyboard With User Configurable Granularity Scales for Pressure Sensitive Keys", U.S. Appl. No. 12/316,703, RCE and Amendment, Nov. 2, 2012, 19 pgs.

Casparian et al., "Systems and Methods for Implementing Haptics for Pressure Sensitive Keyboards", U.S. Appl. No. 12/930,125, Response to Office Action, Nov. 9, 2012; 23 pgs.

Casparian et al., "Systems and Methods for Implementing Haptics for Pressure Sensitive Keyboards", U.S. Appl. No. 12/930,125, Final Office Action, Jan. 2, 2013; 22 pgs.

Casparian et al., "Systems and Methods for Implementing Haptics for Pressure Sensitive Keyboards", U.S. Appl. No. 12/930,125, Office Action, Aug. 9, 2012; 16 pgs.

Casparian et al., "Systems and Methods for Implementing Haptics for Pressure Sensitive Keyboards", U.S. Appl. No. 14/044,331, filed Oct. 2, 2013, Third Preliminary Amendment; Dec. 16, 2013, 23 pgs.

Casparian et al., "Apparatus and Methods for Mounting Haptics Actuation Circuitry in Keyboards", U.S. Appl. No. 12/930,118, filed Dec. 29, 2010, Amendment, Dec. 27, 2013, 19 pgs.

Casparian et al., "Systems and Methods for Implementing Haptics for Pressure Sensitive Keyboards", U.S. Appl. No. 12/930,125, filed Dec. 29, 2010, Amendment, Dec. 27, 2013, 23 pgs.

Casparian et al., "Systems and Methods for Implementing Pressure Sensitive Keyboards", U.S. Appl. No. 12/802,468, filed Jun. 8, 2010, RCE and Amendment, Aug. 12, 2013, 25 pgs.

Cherry Corporation, MX Series Key Switch, Obtained From Internet Aug. 12, 2013, 9 pgs.

Cherry Corporation, Keymodule MX, Obtained from Internet Jul. 25, 2013, 2 pgs.

The Keyboard Company, An Introduction to Cherry MX Mechanical Switches, Obtained from Internet Jul. 25, 2013, 7 pgs.

(56) References Cited

OTHER PUBLICATIONS

Zhang et al., Systems and Methods for Intelligent System Profile Unique Data Management:, U.S. Appl. No. 13/618,666, filed Sep. 14, 2012, 32 pgs.
Casparian et al., "Systems and Methods for Lighting Spring Loaded Mechanical Key Switches", U.S. Appl. No. 14/013,603, filed Aug. 29, 2013, 50 pgs.
Casparian et al., "Systems and Methods for Implementing Spring Loaded Mechanical Key Switches With Variable Displacement Sensing", U.S. Appl. No. 14/013,724, filed Aug. 29, 2013, 57 pgs.
Casparian et al., "Apparatus and Methods for Mounting Haptics Actuation Circuitry in Keyboards", U.S. Appl. No. 12/930,118, filed Dec. 29, 2010, Office Action, Oct. 4, 2013, 21 pgs.
Casparian et al., "Systems and Methods for Implementing Haptics for Pressure Sensitive Keyboards", U.S. Appl. No. 14/044,331, filed Oct. 2, 2013, 87 pgs.
Casparian et al., "Systems and Methods for Implementing Haptics for Pressure Sensitive Keyboards", U.S. Appl. No. 14/044,331, filed Oct. 2, 2013, Preliminary Amendment; Oct. 15, 2013, 22 pgs.

* cited by examiner

US 8,700,829 B2

SYSTEMS AND METHODS FOR IMPLEMENTING A MULTI-FUNCTION MODE FOR PRESSURE SENSITIVE SENSORS AND KEYBOARDS

FIELD OF THE INVENTION

This application relates to systems and methods for input devices and, more particularly, to systems and methods for pressure sensitive sensors of input devices.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems use keyboards to obtain user input. Some prior keyboard solutions have provided pressure sensitive keys. The most common technique to provide pressure sensitive keys is to use variable resistance sensing techniques to provide an indication of the pressure applied by a user to a key. Variable capacitance sensing has also been utilized in some prior art products such as console gamepad controllers. While pressure sensitive buttons have been used before, improved techniques and control of pressure sensitive keys are still needed, particularly for gaming keyboards.

A computer peripheral produced in the form of a joystick controller has been developed that allows a computer user to map up to three computer keyboard keys or a combination of such keys to the joystick movement such that the keys or combination of keys is indicated to the computer by how far the joystick is moved along a given axis (i.e. by percentage of maximum joystick travel). Such a joystick controller is an external peripheral that is separate and different from the computer keyboard functions by performing a simple software mapping. Today's legacy USB keyboards support a single scan code per key.

Keyboard macro button support has also been provided for gaming keyboards by assigning a macro to a physical macro key. The key physically is attached to the keyboard's legacy scan matrix and uses unused row/column intersection points and uses an unassigned scan code per macro key. In such a configuration, if the keyboard has 5 macro keys, which are attached to the legacy scan matrix, the keyboard can only support 5 macros, or one macro per key.

SUMMARY OF THE INVENTION

Systems and methods are disclosed herein for implementing one or more individual pressure sensitive sensors that each support multiple native scan codes, with each scan code corresponding to a unique pressure level output. For example, a single variable pressure sensitive key may itself support multiple different native scan codes that are each normally only assigned to a single conventional momentary on key of a QWERTY keyboard. The disclosed systems and methods may be advantageously implemented in one exemplary embodiment to allow users (e.g. such as computer gamers) to leverage the capability of a variable pressure keyboard by providing an information handling system having individual variable pressure keys that are each capable of outputting different macro information (e.g., multi-key sequence) per key pressure level sensed.

The disclosed systems and methods may be implemented, for example, to convert a single sensor broadcast from a variable pressure sensor into macro information that includes multiple scan codes, thus allowing for the creation of different application behaviors (e.g., computer game behaviors) from a single variable pressure sensor depending on the amount of finger pressure applied to the pressure sensitive sensor that may be provided on a keyboard, mouse, game controller or any other device employing pressure sensitive sensor inputs. In one exemplary embodiment, this capability may be supported by assigning individual macros to an unassigned scan code that is one of multiple scan codes supported by each variable pressure sensor, e.g., a variable pressure key of an information handling system keyboard. In this way, scan codes may be dynamically selected in real time depending on the amount of pressure applied to a given sensor based on the user defined profile for that given sensor. Thus, a single physical key may be employed to support performing, for example, 5 macros (acting as 5 virtual keys), and/or to support switching between macro outputs in real-time based on a variable input such as finger pressure.

In one exemplary embodiment, the pressure sensitive keys of an information handling system keyboard may be further configured to operate in a legacy "momentary on" mode of operation (i.e., to emulate normal "momentary on" open/short digital key signals), for example, such as during boot-up prior to loading an operating system, during sleep mode, or any other time a user wishes to operate in such a legacy mode by default. In yet another exemplary embodiment, the variable pressure sensitive keys of an information handling system keyboard may be further configured to operate in a single-function mode, in which the native scan code for the key is outputted but at a repetition rate that increases with an increase in finger pressure applied to the key, e.g., auto-toggling of a given key may be performed by sending its key code to a USB IN endpoint at the rate that the user has selected for a given pressure level. A software timer may be maintained and compared against the user repetition rate to determine when it is time to send the key code out. In essence, the software timer may act in such an embodiment as a variable delay mechanism. For example, the repeat rate for "W" at pressure level 1 may be set at 1 ms, and for pressure level 2 is 5 ms, etc. Two independent software timers may be used in such an example to implement each rate. Moreover, it is also possible that a single pressure key may be configured to selectively operate in two or more of the three previously described modes, i.e., multiple macro mode, normal "momentary on" mode, and single function variable on/off switching rate mode.

Pressure sensitive sensors of the disclosed systems and methods may be implemented using variable capacitance, variable conductance, variable resistance or any other suitable pressure sensitive measurement methodology to generate selected native scan codes based on the amount of pressure applied to a given sensor at any given time. The pressure-dependent scan codes may be supplied, for example, directly to a keyboard device driver layer executing on a processing device of an information handling system. In one exemplary embodiment, the disclosed systems and methods may be advantageously implemented to provide a drop-in "replacement" keyboard for a standard-type momentary-on keyboard of an information handling system, e.g., portable information handling system such as a notebook computer that employs a conventional keyboard controller configured to receive momentary-on digital key signals and no analog keyboard signals. Other examples of portable information handling system include, but are not limited to, MP3 players, portable data assistants, cellular phones, tablet computers, etc.

In the practice of the disclosed systems and methods, pressure sensing measurement circuitry and/or pressure-based scan code selection circuitry may be, for example, embedded or integrated within a keyboard controller, though it may also be located external to the keyboard controller as well. In the latter case, a "drop-in" keyboard having both conventional momentary-on and pressure sensitive keys with pressure-based scan code selection may be provided. Such a drop-in keyboard may be configured with digital outputs for the momentary-on keys that are compatible with a legacy digital keyboard controller, and with separate digital output bus for pressure-based scan codes (e.g., from a keyboard-integrated variable pressure sensor "VPS" controller) directly to the device driver layer of an information handling system.

The above-described capability may be implemented in one embodiment, for example, to provide a "drop-in replacement" of a current production keyboard array for an information handling system such as a notebook computer (e.g., for build-to-order specification, after market replacement in an existing previously built information handling system, updated production run, etc.) with little or no modification to mechanical, electrical, or operating system (OS) of the existing information handling system. In such an embodiment, the pressure sensitive keys and the pressure-sensing digital output circuitry may be integrated into a replacement keyboard assembly that is substantially mechanically and electrically compatible with the information handling system host equipment. This capability may be advantageously employed, for example, to enable a build-to-order methodology in which either type of keyboard (i.e., traditional keyboard with only momentary-on keys, or gaming keyboard with at least some pressure sensitive keys together with pressure-based scan code selection capability) may be selectively assembled to a common information handling system notebook chassis or common desktop keyboard chassis having a legacy keyboard controller, e.g., based on details of a specific customer order.

The disclosed pressure sensitive sensor measurement methods and systems may also be optionally implemented in one exemplary embodiment with user configurable pressure sensitive keys and techniques for controlling these keys for keyboards, or alternatively in similar manner with user configurable pressure sensitive sensors of other types. For example, in a keyboard embodiment user configuration information, including information for user configurable macros (and optionally granularity scales), may be communicated from a host system to the keyboard and stored for later use by a keyboard controller or other processing device associated with the keyboard to control the operation of the pressure sensitive keys. Alternatively, such user configuration information may be employed by a software application operating on the host system that communicates with a keyboard controller to control the operation of the pressure sensitive keys. Either way, greater control of the pressure sensitive keys may be provided. This configurability is of particular use for applications such as where the keyboard is being used for gaming by a user running a gaming application on an information handling system. In particular, the user may configure selected macros and combinations of macros (and optionally also configure the granularity scale) for each pressure sensitive key so that each key may provide a desired gaming response. In addition, different configuration files may be stored so that a user may select and use different configurations for different games and/or different users may select and use different configurations based upon their personal preferences.

In one respect, disclosed herein is a variable pressure sensor processing system, including at least one processing device configured as a multiple macro information creation component coupled to receive an analog output signal from each given one of one or more pressure sensitive sensors that is representative of pressure applied to the given sensor. The multiple macro information creation component may be configured to: detect an identity of a given one of the pressure sensitive sensors to which pressure is being applied based on a received one of the analog output signals; detect a level of pressure applied to the given one of the pressure sensitive sensors based on the received one of the analog output signals; and select and produce a given macro information that corresponds to the detected combination of sensor identity and pressure level applied to the given one of the pressure sensitive sensors.

In another respect, disclosed herein is an information handling system, including: at least one processing device configured to execute a user application thereon; keyboard circuitry including one or more pressure sensitive keys configured to provide analog output signals corresponding to each given one of the pressure sensitive keys that is representative of pressure applied to the given key; and at least one processing device configured as multiple macro information creation component coupled to receive the analog output signal from each given one of the pressure sensitive keys. The multiple macro information creation component may be configured to: detect an identity of a given one of the pressure sensitive keys to which pressure is being applied based on a received one of the analog output signals, detect a level of pressure applied to the given one of the pressure sensitive keys based on the received one of the analog output signals, select and produce a given macro information that corresponds to the detected combination of key identity and pressure level applied to the given one of the pressure sensitive keys, and provide the given macro information to the at least one user application.

In another respect, disclosed herein is a method of accepting input from one or more variable pressure sensors, including: providing one or more pressure sensitive sensors; producing an analog output signal for each given one of the pressure sensitive sensors when depressed by a user, the analog output signals being representative of pressure applied to the given pressure sensitive sensor by the user; providing one or more variable pressure sensor processing components including at least one processing device configured as multiple macro information creation component; receiving the analog output signal in the variable pressure sensor processing components from each given one of one or more pressure sensitive sensors that is representative of pressure applied to the given sensor; and using the variable pressure sensor processing components to perform the following steps: detecting an identity of a given one of the pressure sensitive sensors to which pressure is being applied based on a received one of the analog output signals, detecting a level of pressure applied to the given one of the pressure sensitive sensors based on the received one of the analog output signals, and selecting and producing a given macro information that corresponds to the detected combination of sensor identity and pressure level applied to the given one of the pressure sensitive sensors.

DESCRIPTION OF ILLUSTRATIVE EMBODIMENTS

Figure 1:
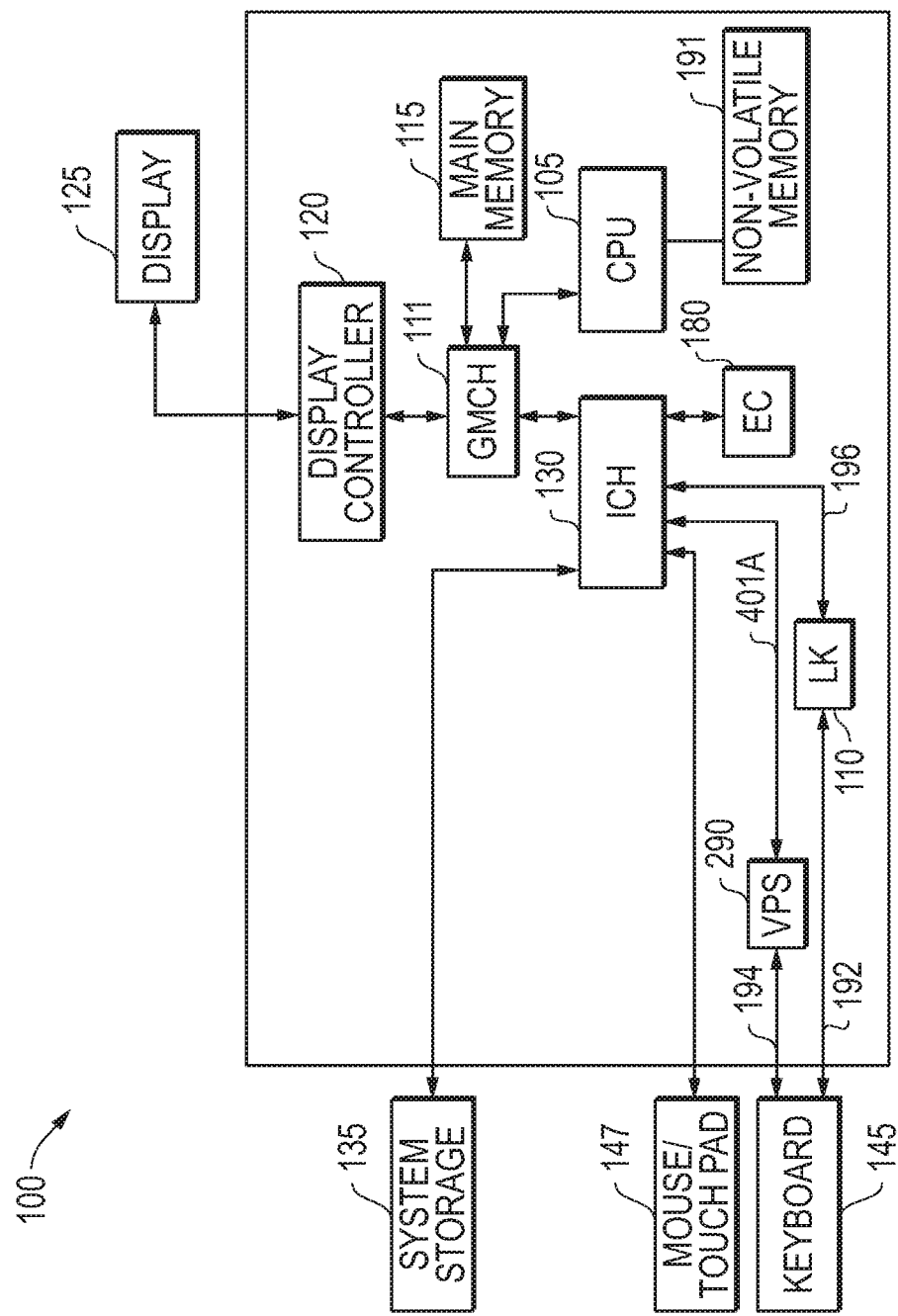
FIG. 1 illustrates a block diagram of an information handling system according to one exemplary embodiment of the disclosed systems and methods.

FIG. 1 is a block diagram of an information handling system 100 as it may be configured according to one exemplary embodiment of the disclosed systems and methods. Information handling system 100 may be, for example, a desktop computer, server, or a portable information handling system such as a notebook computer. As shown in FIG. 1, information handling system 100 of this exemplary embodiment includes a CPU 105 such as an Intel Pentium series processor, an Advanced Micro Devices (AMD) processor or one of many other processing devices currently available. A graphics/memory controller hub (GMCH) chip 111 is coupled to processor 105 to facilitate memory and display functions. System memory 115 and a display controller 120 may be coupled to GMCH 111. A display 125 (e.g., LCD display or other suitable display device) is coupled to display controller 120 to provide visual images to the user. An I/O controller hub (ICH) chip 130 is coupled to GMCH chip 111 to facilitate input/output functions for the information handling system. Local system storage 135 (e.g., one or media drives such as hard disk drive/s, optical drives, etc.) may be coupled to ICH chip 130 to provide permanent system storage for the information handling system. An embedded controller (EC) 180 running system BIOS and system BIOS non-volatile memory 191 are each also coupled to ICH chip 130.

Still referring to FIG. 1, a key input area 145 of a keyboard input device along with other optional input devices (e.g., such as mouse and/or touchpad 147) are also coupled to ICH chip 130 to enable the user to interact with the information handling system. In this exemplary embodiment key area 145 is coupled to provide a digital output signal 192 from momentary on digital keys to legacy keyboard (LK) controller 110, which in turn provides scan code signals 196 corresponding to individual depressed digital keys of key area 145 to an appropriate device driver (e.g., PS2 keyboard device driver) executing on CPU 105. In this regard, LK controller 110 may poll all the momentary on digital keys in the key matrix of key area 145 and broadcast a scan code output corresponding to any pressed keys to the operating system (OS) of information handling system 100. It will be understood that in one embodiment, LK controller 110 may be implemented by EC 180, rather than by a separate microcontroller.

In the embodiment of FIG. 1, key area 145 is also coupled as shown to provide analog output signal 194 representative of the pressure applied to individual depressed analog keys of key area 145 to pressure-sensing digital output circuitry 290, which may be for example, a variable pressure sensor (VPS) controller as described further herein. Pressure-sensing digital output circuitry 290 in turn produces pressure-based scan codes 401A to an appropriate device driver (e.g., USB Human Interface Device "HID" driver) executing on CPU 105. As will be described further herein, each of these pressure-based scan codes correspond to a particular combination of the key identity and real time specific pressure applied to individual depressed analog keys of key area 145. It will be understood that the particular configuration of FIG. 1 is exemplary only, and that an information handling system may be configured with fewer, additional or alternative components than those illustrated in FIG. 1, e.g., including a network interface card (wired and/or wireless). It will also be understood that in other embodiments, one or more other types of input devices (e.g., mouse, game controller, etc.) may additionally or alternatively be provided that is coupled to provide an analog output signal to pressure-sensing digital output circuitry 290 that is representative of the pressure applied to one or more individual depressed analog keys.

The disclosed systems and methods may be implemented using analog-based variable-pressure keys 204 that are optionally incorporated with digitally-based momentary-on keys 206 of typical keyboards to make a keyboard that supports both regular make/break keys 206 and keys 204 with variable finger pressure sensitivity, and in one exemplary embodiment that is at the same time compatible with legacy "momentary-on" measurement keyboard controllers such as are typically found in information handling systems such as notebook and desktop computers. Thus, from one to all keys of a given input device (e.g., such as a keyboard) may be implemented using pressure-sensitive sensors, such as variable conductance, variable resistance, or variable capacitance sensors. One example of pressure sensitive sensors that may be employed are rubber dome keys (e.g., with conductive half-spheres or half-domes located on the underside of the rubber domes) in combination with a printed circuit board (PCB) or flexible PCB underneath it such that the conductive sphere's surface area contact increases with pressure and thus increases the measurable capacitance of that contact in relationship with a nearby charged trace. Pressure-sensitive sensors may alternatively be variable resistance keys that utilize a sensor material that changes impedance when touched, e.g. by pressure of a user's hand or finger.

Further information on example types of variable pressure sensors (e.g., keys) and associated circuitry, digital key sensors and associated circuitry, and methods and circuitry for sensing and processing signals from the same may be found in U.S. patent application Ser. No. 12/316,703 filed Dec. 16, 2008 (U.S. Publication No. 2010-0148999A1); U.S. patent application Ser. No. 12/802,468 filed Jun. 8, 2010 (U.S. Publication No. 2010-0321301A1); U.S. patent application Ser. No. 12/930,125 filed Dec. 29, 2010 (U.S. Publication No. 2011-0102326A1); and U.S. patent application Ser. No.

12/930,118 filed Dec. 29, 2010 (U.S. Publication No. 2011-0095877A1); each of which is incorporated herein by reference in its entirety.

Figure 2:
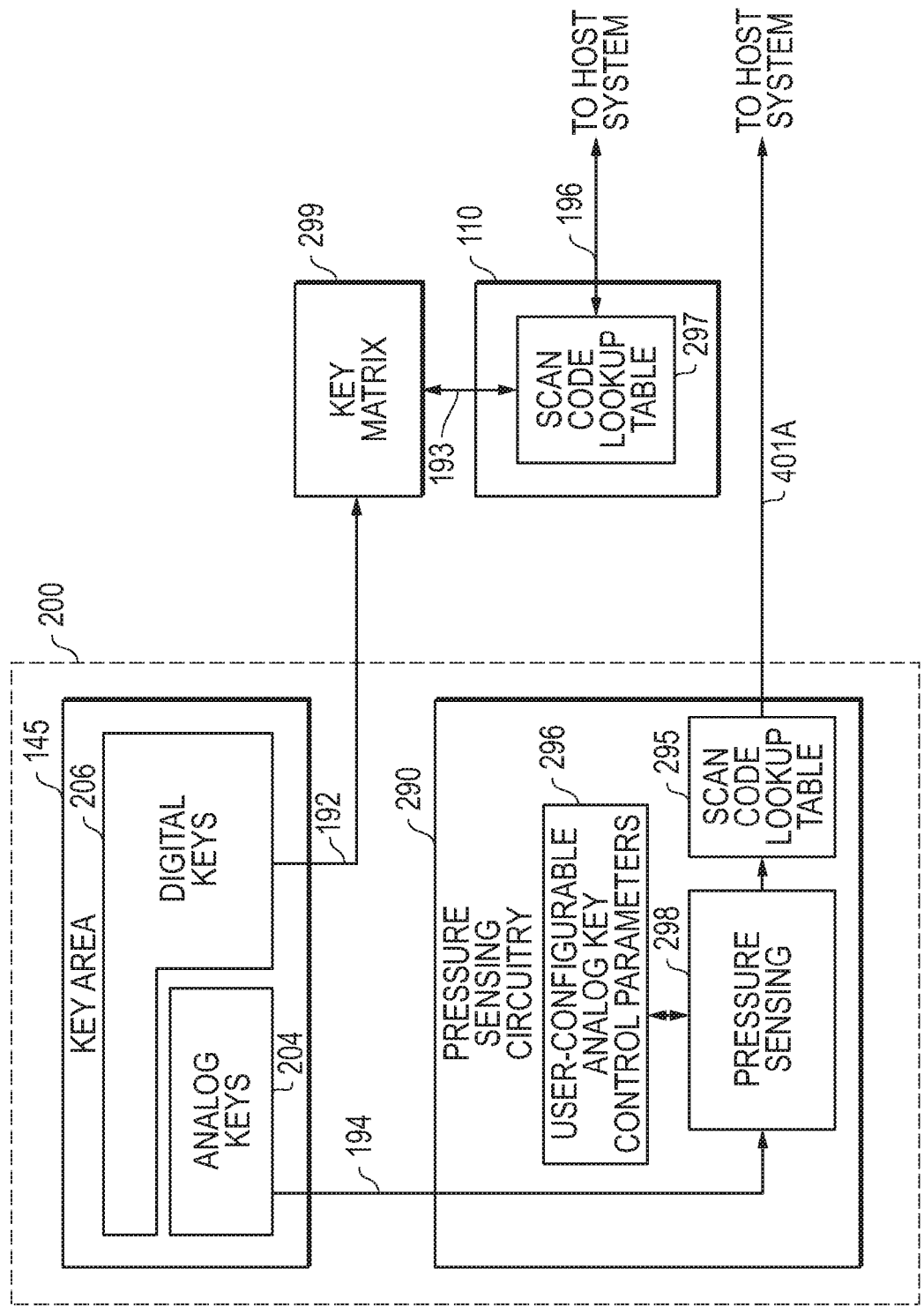
FIG. 2 illustrates a block diagram of a keyboard system according to one exemplary embodiment of the disclosed systems and methods.

FIG. 2 is a block diagram for a keyboard system 200 according to one exemplary embodiment that includes pressure sensitive analog keys 204 and digital keys 206. As depicted, pressure-sensing digital output circuitry 290 (e.g., a VPS controller as described herein) is coupled to analog keys 204 of a key area 145 that is part of a keyboard device body. In this embodiment, the key area 145 includes both analog keys 204 and digital keys 206. The digital keys 206 represent keys that are momentary on keys that are detected as either depressed or not depressed. When a digital key is depressed, a digital output signal 192 is sent to a legacy keyboard controller 110 via key matrix 299 (e.g., a standard 16×8 key matrix) that detects the identity of a pressed digital key 206. The analog keys 204 represent keys that are detected as being depressed by a variable amount or with a variable amount of pressure. When an analog key is depressed, an analog signal 194 indicating the force or extent to which it is depressed is provided to pressure-sensing digital output circuitry 290. Pressure-sensing digital output circuitry 290 may be provided in one exemplary embodiment as an integrated part of a keyboard device body. However, one or more components and/or processing tasks of pressure-sensing digital output circuitry 290 may alternatively be integrated or otherwise implemented within a microcontroller that is operating as the keyboard controller 110 and/or as part of the host system to which the keyboard is connected, if desired. One or more of the components of pressure-sensing digital output circuitry 290 could also be implemented with external circuitry, as well. Thus, it will be understood that the components and/or processing tasks of pressure-sensing digital output circuitry 290 may be implemented by any alternative configuration of one or more processing devices (e.g., controller, microcontroller, processor, microprocessor, ASIC, FPGA, CPU, etc.) of an information handling system or a peripheral component thereof, and alone or together with other types of information handling system processing tasks.

The pressure-sensing digital output circuitry 290 includes a pressure sensing block 298 that receives an analog signal representative of the pressure being applied to each of analog keys 204, and a scan code look up table 295 that is utilized to select and output a pressure-based scan code 401A corresponding to the particular real-time pressure being applied to each of analog keys 204 to external devices, such as host components of an information handling system, through communication path 401A. It will be understood that the particular embodiments illustrated herein are exemplary only, and that the components and function of pressure-sensing digital output circuitry 290 may be implemented using any one or more circuitry components suitable for receiving analog signals representative of key pressure from pressure sensitive keys 204, and for selecting and providing in real time scan code/s corresponding to the key pressure applied to each of pressure sensitive keys 204. Similarly, scan code look up table 297 is configured to process pressed key identification signal 193 and is coupled so that scan code information corresponding to a pressed digital key may be communicated to external devices, such as host components of an information handling system, through communication path 196.

In addition, external devices may optionally communicate control and/or other configuration information to the pressure-sensing digital output circuitry 290 and/or keyboard controller 110 through respective communication interfaces 401A and 196, respectively. Examples of possible information handling system components may be found described in U.S. patent application Ser. No. 12/586,676, filed Sep. 25, 2009, which is incorporated herein by reference in its entirety.

It is noted that communication paths 196 and 401A may take a variety of forms. Each of communication paths 196 and 401A may be a wired communication path or a wireless communication path, as desired. With respect to personal computer systems, such as desktop computers and laptop computers, communication paths 196 and 401A may be, for example, via a Bluetooth interface if a wireless interface is desired and or a USB (universal serial bus) interface if a wired interface is desired. However, it is again noted that any desired communication interface may be utilized. It is further noted that keyboard controller 110 may be implemented as a microcontroller (e.g., legacy 8051-based microcontroller or custom microcontroller) that runs firmware stored on a memory device associated with the keyboard controller 110. Similarly, pressure-sensing digital output circuitry 290 may be implemented as a microcontroller (e.g., a Texas Instruments MSP430F55xx family of USB enabled 16-bit ultra-low power microcontrollers (such as the MSP430F5508), available from Texas Instruments of Dallas, Tex.) that runs firmware stored on a memory device associated with the microcontroller. Any other type of suitable pressure-sensing digital output circuitry may be employed including, for example, circuitry that uses RC discharge time to measure sensor capacitance as described in U.S. Pat. No. 3,936,674, which is incorporated herein by reference in its entirety.

It is also noted that the user configuration information 296 may be optionally stored in random access memory (RAM) or other memory storage that is associated with pressure sensing circuitry 290 (either internally or externally). Thus, configurable analog key control parameters 296 may be stored, for example, on a RAM device in the keyboard or on the host system (e.g., on a hard drive) and may provide a wide variety of configurable parameters that may be adjusted by a user through an application programming interface (API) to a software utility application that, for example, has a graphic user interface (GUI) to allow a user to edit the parameters through the software utility. For example, the user configuration information may be stored, for example, in nonvolatile or volatile memory on board the keyboard system 200. Alternatively, the user configuration information may be stored on the host system or other device that is coupled by communication paths 401B and 405A. Either way, single and/or multiple different user configuration files and/or multiple game (or application) configuration files may be stored allowing a user to select the applicable or desired keyboard configuration file depending on the game or application being used by the user and/or depending upon the particular user using the keyboard at the time, e.g., in a manner as described in U.S. patent application Ser. No. 12/316,703 filed Dec. 26, 2008, which is incorporated herein by reference in its entirety.

Figure 3:
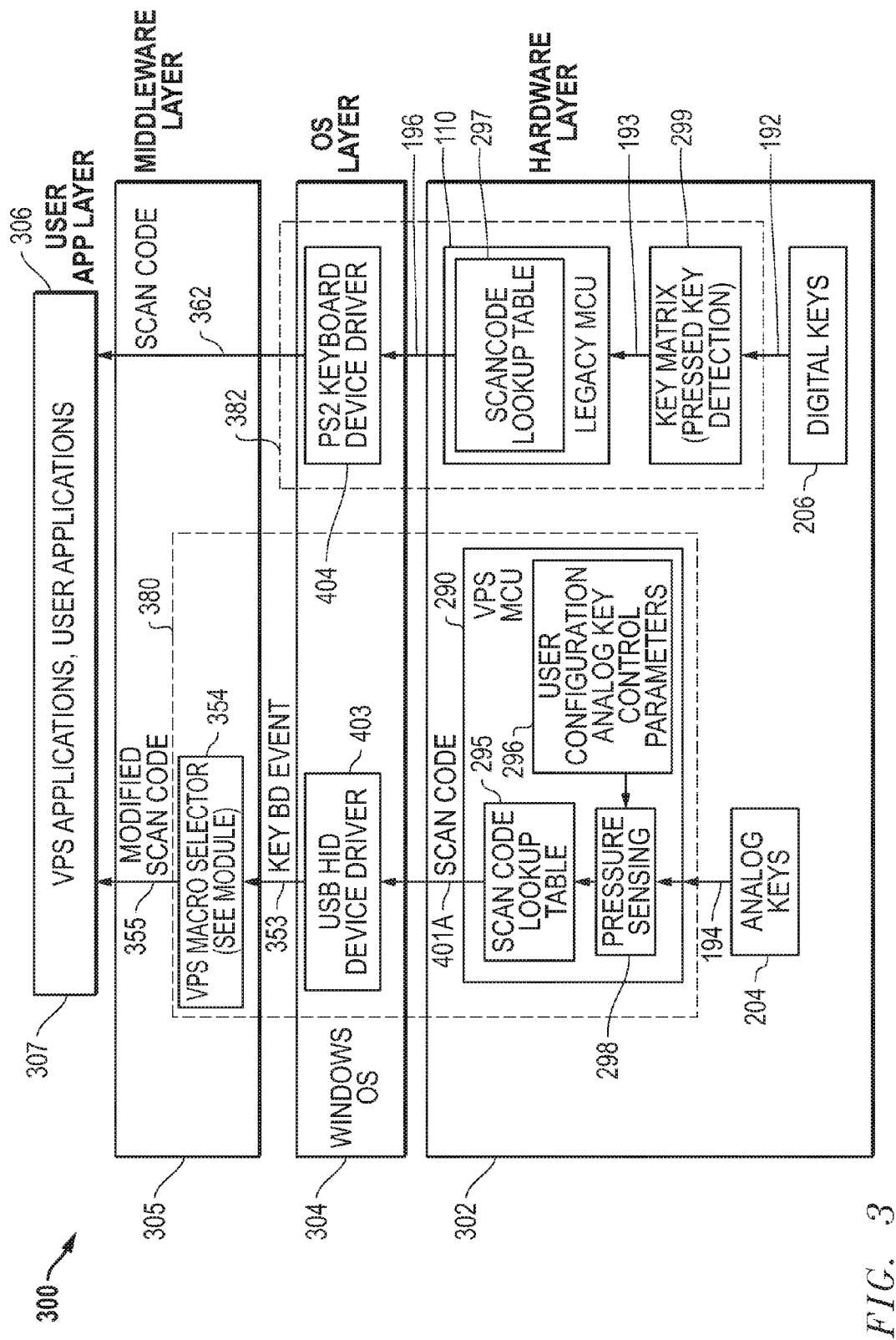
FIG. 3 is a block diagram illustrating a VPS key processing system architecture according to one exemplary embodiment of the disclosed systems and methods.
Figure 4:
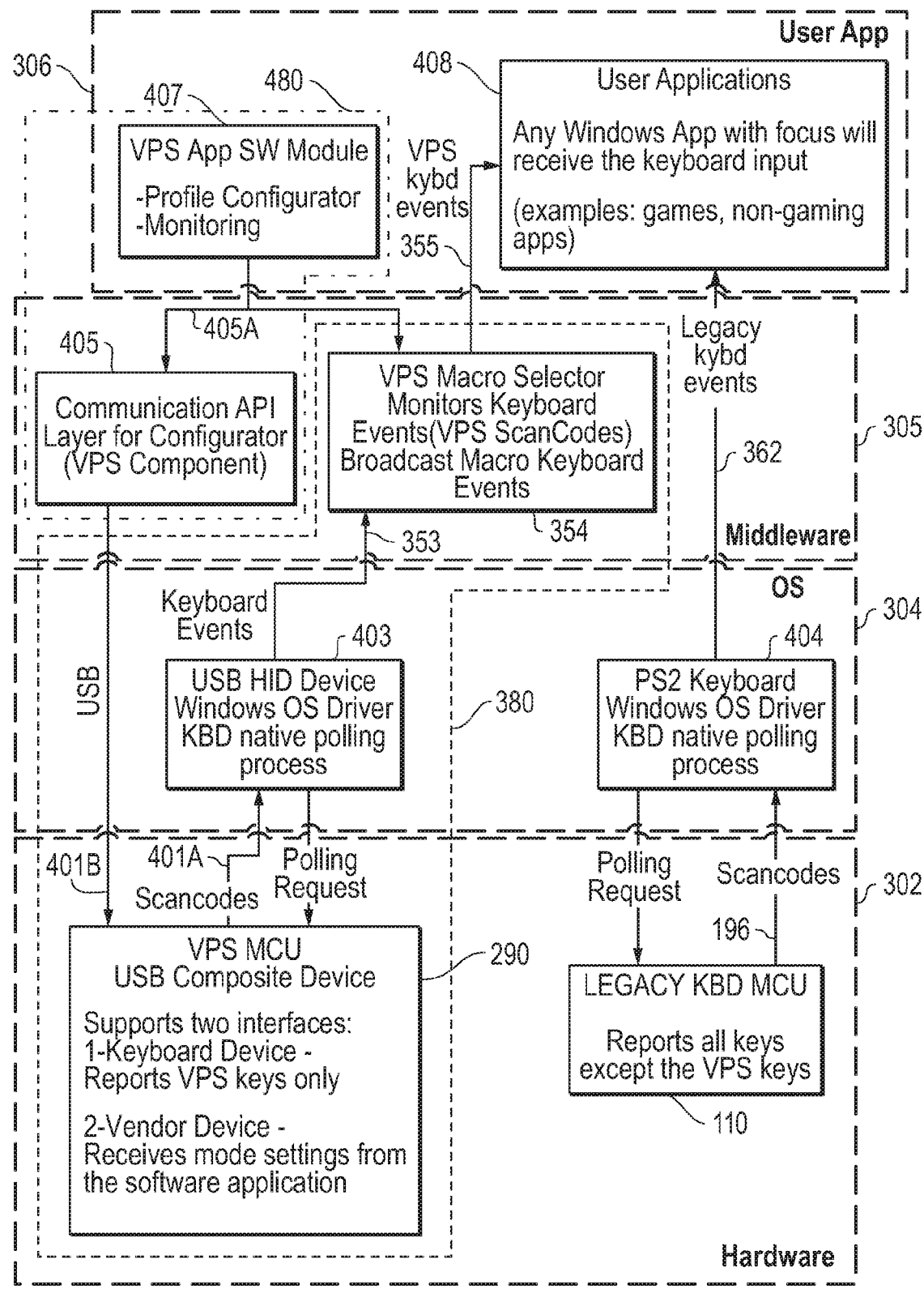
FIG. 4 is a block diagram illustrating a VPS key processing system architecture according to one exemplary embodiment of the disclosed systems and methods.

FIGS. 3 and 4 illustrate the various interacting levels of dual microcontroller (MCU) VPS key processing system architecture 300 that may be employed in one exemplary embodiment to implement momentary-on digital keys 206 together with one or more analog VPS pressure sensitive keys 204 of keyboard system 200 of FIG. 2. As shown in FIG. 3, hardware layer 302 of architecture 300 includes hardware components previously described in relation to keyboard system 200, including pressure-sensing digital output circuitry that may be provided as a VPS MCU 290 that is dedicated and tasked with detecting and processing all VPS keys 204 and a legacy keyboard controller 110 that may be provided as a legacy MCU that is dedicated to handle all non-VPS keys 206. In this embodiment, VPS MCU 290 and legacy MCU 110 may be configured to operate in parallel at all times, although this is not necessary. It will also be understood that a VPS key processing system architecture may alternatively be implemented in another embodiment to only support one or more pressure sensitive keys 204, i.e., without legacy keyboard controller 110 and other related circuitry being provided for non-VPS keys 206. Moreover, it will be understood that one or more components of VPS key processing system architecture 300 may be alternatively implemented to support any other device employing pressure sensitive sensor inputs, e.g., such as mouse, game controller, etc.

Also shown in FIG. 3 are operating system (OS) layer 304, middleware layer 305, and user application layer 306 that may be executing, for example, on CPU 105 of information handling system 100 of FIG. 1. In a manner as will be described further herein, OS layer 304 may include a USB HID driver 403 that receives the VPS pressure-based scan codes 401A from VPS MCU 290, and a PS2 keyboard device driver 404 that receives the legacy scan code signals 196 from legacy MCU 110. USB HID driver 403 in turn provides VPS scan codes 401A as VPS keyboard events 353 to a VPS macro selector component 354 of middleware layer 305, which in turn provides modified VPS scan codes 355 to user application layer 306 (e.g., which may include VPS-enabled and non-VPS enabled applications). VPS macro selector component 354 may then select modified scan codes 355 (e.g., macro information in the form of a multi-key sequence) from a VPS profile based on the identity of the pressed key and the key's pressure level sensed. It will be understood that any other combination of hardware or circuitry (e.g., including one or more processing devices), firmware and/or software may be employed as VPS macro selector component 354 that is suitable for selecting modified scan codes based on the identity of the pressed sensor and the sensor's pressure level sensed.

It will be understood that a scan code (e.g., such as scan code 401A or 196) is a code generated by a controller (e.g., VPS MCU 290 or keyboard controller 110) or other suitable component to represent an individual pressed key (e.g., analog key 204 or digital key 206) for which a component (e.g., component of OS layer 304 such as USB HID driver 403 or PS2 keyboard device driver 404) performs translation to a given key identity (e.g., the scan code "04" translates to the key "a") unless the scan code is reserved. A keyboard event 353 is the mapping of a reserved scan code to a macro (i.e., including one or more key characters).

As shown, key matrix 299, keyboard controller 110, and device driver 404 together implement momentary-on key signal generation circuitry 382 that provides single event momentary on scan codes as keyboard events 362 to a user application 408. It will be understood that momentary-on key signal generation circuitry 382 may be implemented in any other suitable manner (e.g., with alternate hardware, firmware, and/or software) in other embodiments to perform a legacy momentary on digital key signal generation task. It will also be understood that the term "VPS keyboard event" is used herein to refer to the combination of the identity of a pressed VPS key 204 plus the key pressure level value sensed for the identified pressed VPS key 204. As further shown, PS2 keyboard device driver 404 may provide legacy scan codes 196 as legacy keyboard events 362 to user application layer 306.

In this exemplary embodiment, VPS MCU 290, USB HID driver 403, and VPS macro selector component 354 may be implemented together as multiple macro information creation component 380 that provides the modified VPS scan codes 355 to user application layer 306, it being understood that any other combination of hardware or circuitry (e.g., including one or more processing devices), firmware and/or software may be employed as multiple macro information creation component 380 that is suitable for selecting and outputting different macro information (e.g., modified scan codes 355) in real time based on the corresponding real time pressure level applied to a given VPS analog key 204 in a manner as described elsewhere herein. As further described, multiple macro information creation component 380 may also be configured to store and consult VPS profiles to select given macro information based on a given VPS pressure level.

Referring now to FIG. 4, VPS MCU 290 may in one embodiment be configured as a USB Composite Human Interface Device (HID) that exclusively provides all assigned VPS key codes to the OS layer 304, e.g., such as Windows-based OS or other suitable OS. In the case of a Windows OS, VPS MCU 290 may use Windows OS in-box drivers 403 for broadcasting the scan codes of the VPS keys 204. This architecture may be advantageously implemented in one exemplary embodiment to require only the OS "in-box" drivers 403 and 404 (e.g., Windows OS in-box drivers) to handle all keyboard events from VPS analog keys 204 and momentary-on digital keys 206. No original design manufacturer (ODM) or third-party software is required for OS layer 304 in such an embodiment. Such a characteristic may be employed to provide simplicity and transparency of the keyboard 145 to the User Applications 408.

Still referring to FIG. 4, VPS MCU 290 may be tasked to detect VPS key 204 presses, measure the amount of finger pressure applied to a VPS key 204, associate that pressure of that detected pressed VPS key 204 to a pre-assigned unique key scan code 401A, and broadcast the corresponding key code 401A to the OS layer 304. The unique key scan code may then be further processed by the Macro selector component 354 that then broadcasts the corresponding user-defined scan code as per the given pressure level for the given pressed key as a VPS keyboard event to one or more applications 408 residing in user application layer 306. User applications 408 may be, for example, Windows-based applications such as games or non-gaming applications (e.g., Microsoft Office or other business software applications). User applications 408 may be executing from local storage and/or may be cloud-based applications executing from across a network such as the Internet or a corporate area network, etc.

As shown in FIG. 4, VPS MCU 290 may have one USB keyboard interface 401A dedicated to broadcasting key scan codes to device driver 403 of OS layer 304, and may be configured with an optional configuration interface 401B (e.g., a USB vendor-specific interface or other suitable configuration interface) dedicated to communication with optional VPS macro configuration component 480. Device driver/s 403 may periodically poll or scan the key matrix of analog VPS keys 204 looking for key presses of the analog keys 204. As shown, VPS macro configuration component 480 may be implemented in one exemplary embodiment as a VPS configuration application 407 that includes configuration and monitoring components, and that communicates with VPS MCU 290 of macro information creation circuitry 380 via communications application programming interface (API) 405 provided in middleware layer 305. In this embodiment, communication API 405 may be present as a software module that gives VPS-aware applications 408 access to VPS protocol for the purpose of configuring and monitoring the VPS keys 204 per a user defined VPS profile as defined for any given application 408. As shown, this communication may occur over a USB network to the VPS MCU 290 via interface 401B. It will be understood that any other combination of hardware or circuitry (e.g., including one or more processing devices), firmware and/or software may be employed as VPS macro configuration component 480 that is suitable for accepting user input and defining VPS profiles in a manner as described elsewhere herein.

In the illustrated embodiment of FIG. 4, monitoring components of VPS configuration application 407 may be provided to monitor the system for events that will close the current system login session (e.g., logoff, lock or switch user) to place the multiple macro information creation component 380 in a "Legacy" mode where the scan codes for all VPS keys 204 are switched to their legacy/native conventional scan codes. Upon detection of such an event, VPS configuration application 407, may send a specific protocol command to the firmware of the VPS MCU 290 to force the Legacy mode. Such a capability may be implemented, for example, in the event that the information handling system 100 goes into sleep mode, the user logs off their Windows session, system power is accidentally lost, etc. In such a case, assuming the user's OS password (e.g., Windows password) happens to include a key character corresponding to one of the VPS keys 204, this monitoring capability may be employed to cause the switch of all VPS keys' scan codes to that of their respective legacy/native scan codes to enable a "Legacy" mode of operation.

VPS configuration application 407 may be configured to provide a VPS configuration profile to VPS MCU 290 across configuration interface 401B. Such a VPS configuration profile may specify, for example, the correlation of one or more given pressure levels to one or more corresponding unique key scan codes, with multiple pressure levels being supported. In one exemplary embodiment, a VPS configuration profile may be provided as a file of settings specifying how VPS keys 204 shall behave for a given application 408 (e.g., game, Microsoft Office application, etc.). Thus, VPS configuration application 407 may provide a VPS configuration profile to customize the behavior of the VPS keys 204 for any given application 408, it being understood that multiple different VPS configuration profiles may be provided by VPS configuration application 407 as needed or desired to so support corresponding multiple applications 408.

In one exemplary embodiment, VPS configuration application 407 may be configured as a component that is accessible to the user of information handling system 100 in the form of an interactive GUI application on display 125. Using VPS configuration application 407, a user may create, maintain, store and enable VPS keyboard profiles customized for each different application 408 and/or combinations of applications 408. For example, a user may configure the number of and desired pressure level points for each VPS key 204, as well as assign macro information to each key pressure level value. This user-input profile data may be stored, for example, onto system storage 135 as a VPS configuration profile, and routed to the proper destinations. For example, when a given VPS profile is enabled into effect, the given profile may be sent from VPS configuration application 407 to VPS MCU 290 using the communication API 405 and USB network interface 401B. It will be further understood that multiple profiles may be defined and saved, e.g., for each user, application, operating environment, etc.

Further shown in the exemplary embodiment of FIG. 4 is VPS Macro selector component 354 that may be provided as shown in middleware layer 305 to monitor VPS keyboard events in the form of scan codes 401A provided from VPS MCU 290 via device driver 403. In this embodiment, VPS Macro selector component 354 may be configured to convert a single scan code from VPS MCU 290 into a set or group of scan codes (i.e., a set of multiple scan codes corresponding to each of two or more pressure levels that may be applied to VPS keys 204) dynamically in real-time. In this regard, VPS Macro selector component 354 may monitor scan codes 401A that are provided from VPS MCU 290 via device driver 403 and that each correspond to a different applied pressure level to one of VPS keys 204. VPS Macro selector component 354 may then assign a different user defined macro information (e.g., as defined by a user profile provided by VPS configuration application 407) to each such corresponding different intercepted scan code 401A. VPS Macro selector component 354 may then broadcast this defined corresponding macro information to the respective user's application 408. As previously described, VPS Macro selector component 354 may receive user defined macro information as part of a VPS configuration profile that is received from upper-layer VPS configuration application 407 for user configuration behavior.

Following is just one example of how VPS Macro selector component 354 may be configured to assign a different user defined macro information to each different corresponding scan code 401A for a given user application 408. In this example, it will be assumed that the "W" key of a QWERTY keyboard is configured as a VPS key 204, and has been pressed by a user with a particular finger pressure value of "x". In this example, the VPS MCU 290 reports the "W" key scan code 401A via the native OS device driver/s 403 to the VPS Macro selector 354. Upon receipt of this current scan code information, VPS Macro selector 354 in turn consults the current VPS user profile in effect that has been assigned and received from VPS configuration application 407. In particular, VPS Macro selector 354 determines the currently measured finger pressure level from the scan code information and finds the corresponding character or sequence of characters in the current user VPS key profile that is assigned to that pressure level for the "W" key and broadcasts that code sequence out to the designated user application 408 as a keyboard event. In this way, VPS Macro selector 354 acts to intercept the scan code broadcast and to dynamically convert it to the applicable key code as defined by the user in the current VPS key profile and continues to broadcast that defined key code to the designated user application 408 as a keyboard event. Using the methodology of this embodiment, it is possible to achieve a sufficiently fast intercept-to-conversion speed such that the user never sees a latency from the applied finger pressure action to the resulting response on the display 125 of an information handling system 100.

A VPS user profile provided from VPS configuration application 407 as described above may be, for example, defined by input via a graphical user interface (GUI) to VPS configuration application 407 from a user of information handling system 100. For example, a user may specify that when the "W" key is pressed with a first particular force "x", VPS Macro selector 354 will select and output first macro information as a scan code that is equivalent to a first key sequence of "a+b+c". After understanding that the VPS key "W" has been pressed with "x" pressure, and that this corresponds to a key code of "a+b+c", it then broadcasts the key code of "a+b+c" as a keyboard event (e.g., key character sequence) out to the user application 408. In this way, one initial VPS key event is able to generate macro information (e.g., one or more grouped key codes) due to the function of the VPS Macro selector module 354. The same VPS user profile provided from VPS configuration application 407 may specify that when the same "W" key is pressed with a second and different particular force "y", VPS Macro selector 354 will output second macro information as a scan code equivalent to a second and different key character sequence of "d+e+f", such that after understanding that the VPS key "W" has been pressed with "y" pressure, VPS Macro selector 354 will then broadcast the second key sequence of "d+e+f" as a keyboard event to the user application 408. In this way, each different VPS key event is able to select and generate macro information of one or more grouped key sequences due to the function of the VPS macro selector module 354. It will also be understood that different macro information (e.g., different key or character sequences) for a user-defined VPS profile may be defined for each different VPS key 204 (e.g., "S" key, "A" key, etc.) in a similar manner for a particular force "x" applied by a user to each such different VPS key 204.

Still referring to the embodiment of FIG. 4, legacy keyboard MCU 110 may be provided and configured such that when non-VPS keys (e.g., digital keys 206) are pressed, the legacy keyboard MCU 110 processes the keys in its normal (i.e., conventional) manner by detecting which digital keys 206 are pressed from the digital key matrix and then broadcasting legacy scan codes corresponding to the individual pressed keys to a device driver/s 404 (e.g., native PS2 keyboard Windows OS driver), which then provides corresponding legacy keyboard events to the application/s 408. In this regard, device driver/s 404 may periodically poll or scan the key matrix of digital momentary on keys 206 looking for key presses of the digital keys 206. This polling of the matrix of digital keys 206 by device driver/s 404 may be performed separately and in parallel to the polling of the matrix of analog keys 204 performed by device driver/s 403. Utilizing this multi-controller approach (i.e., with separate and different controllers provided for handling output from VPS keys 204 and digital keys 206) in combination with native OS layer device drivers offers simplicity and speed enhancements, e.g., in one embodiment with substantially no latency and very fast responsiveness to a user's applied finger pressure.

In one exemplary embodiment, the OS (e.g., Windows-based OS) 304 may be configured when coupled to the VPS keyboard 145 to detect each of the two respective keyboard controllers 290 and 110 of keyboard 145 (e.g., each MCU may be enumerated), and to combine the output from both controllers 290 and 110 to produce results. For example, if a user simultaneously presses a non-VPS digital key 206 (e.g., such as "Shift" key), and an analog VPS key 204 (e.g., such as "W" key), the VPS MCU 290 may be configured to recognize the "W" key as being pressed and the Legacy keyboard MCU 110 may be simultaneously configured to recognize the digital non-VPS "Shift" key as being pressed, and both characters are broadcast by the separate controllers to the OS 304 as "Shift"+"W". In this manner, the source of the keyboard event may be transparent to the User Applications 408 such that legacy applications written years ago will be able to work with the VPS keyboard 145 (i.e., the legacy user application will receive the keyboard event as if produced by a conventional all-digital key legacy keyboard).

It will be understood that the arrangement and number of components, processing devices, processing tasks, and/or features illustrated and described in relation to FIGS. 3 and 4 are exemplary only. Thus, any other alternative configuration of fewer, additional and/or alternative circuitry and/or logic components may be employed that is suitable for implementing one or more individual pressure sensitive keys that each support multiple native scan codes, with each scan code corresponding to a unique pressure level output, and that is capable of outputting different assigned macro information (e.g., multi-key sequence including user-assigned scan codes) per key pressure level sensed from individual pressure sensitive keys.

Figure 5:
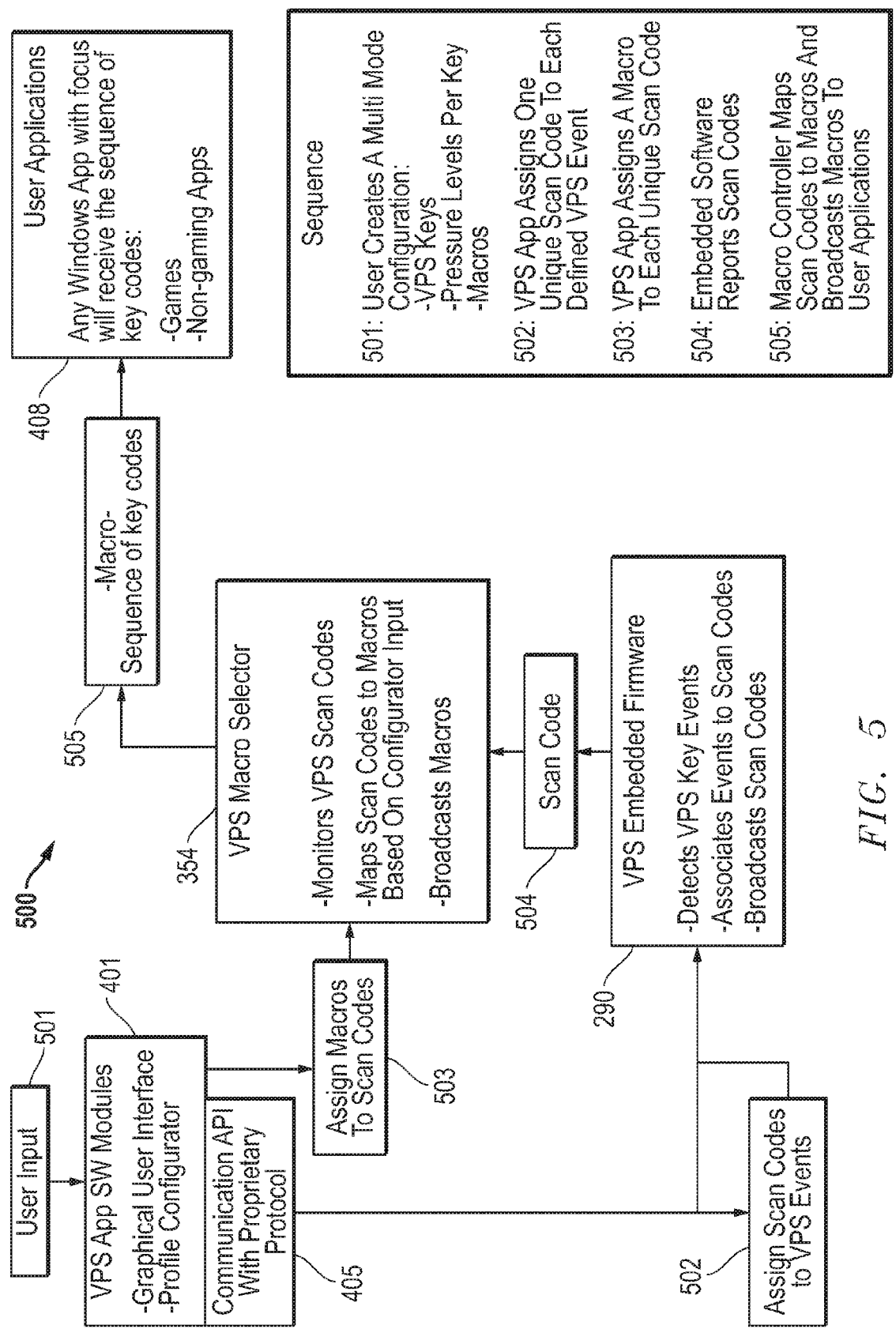
FIG. 5 illustrates process flow according to one exemplary embodiment of the disclosed systems and methods.

FIG. 5 illustrates one exemplary embodiment of a process flow 500 for converting a scan code to macro information using the architecture of FIG. 4 when VPS capability is operational. The process 500 starts in step 501 where the user creates a VPS profile for a particular selected application 408 using the VPS App SW Module 407 (e.g., via input to a GUI). When creating a new VPS profile the user may define, for example, which VPS keys 204 the user wishes to use; how many pressure levels the user wants recognized for each VPS key 204; if a given key 204 shall operate as a traditional momentary-on key (e.g., by outputting a single native (legacy) key code instead of a key sequence when pressed), single-function mode VPS key (e.g., variable on/off switching rate mode that outputs a repeating single native (legacy) key code that varies corresponding to the detected key pressure level), or multi-function (e.g., macro) mode VPS key; etc. When the user selects to enable multi-function mode for a particular VPS key 204 in step 501, the user may also be allowed in step 501 to define the desired behavior for each recognized pressure level for that key, e.g., the user may be allowed to create and/or specify a unique sequence of key strokes as macro information corresponding to each VPS event. This user selected macro information for the VPS events may be all saved as a VPS profile for the particular selected application 408 on system storage 135. It will be understood that multiple such user-created VPS profiles may be similarly created and simultaneously stored on system storage 135, e.g., for later retrieval and use and/or for retrieval as needed by operation of a given application 408.

Next, after a user creates and enables a particular VPS profile to take effect in step 501, this VPS profile may be provided in step 502 to VPS MCU 290 in order to assign scan codes to VPS events. For example, a created user profile may be flashed to firmware of VPS MCU 290 from VPS App SW Module 407 via the VPS Communication API 405, and may include scan codes assigned to corresponding individual VPS events that will be detected in the future by VPS MCU 290 (with each individual VPS event being a different combination of the identity of a pressed VPS key plus the key pressure level value sensed for the identified pressed VPS key 204). Following step 502, the VPS MCU 290 is knowledgeable of the number of pressure level values per individual VPS key 204 that are to be detected and reacted to, as well as the particular scan codes applicable to each of these VPS events for the particular VPS key 204. In step 503, the VPS App SW Module 407 assigns the user-specified macro information (e.g., corresponding to each of the different pressure levels per VPS key 204) to scan codes and sends this to the VPS Macro selector 354. In one exemplary embodiment, step 503 may be performed in parallel with step 502. In any case, step 502 may be performed in one exemplary embodiment to set up the VPS MCU 290 in advance, e.g., to provide a responsive user experience by enabling fast speed and minimal latency of VPS MCU 290 operation.

In step 504, VPS MCU 290 may respond to detected VPS key events by providing to the VPS Macro selector component 354 the applicable assigned scan code corresponding to each detected VPS event received from VPS keys 204. In this regard, as a VPS key event is detected by VPS MCU 290, firmware (embedded software) may associate the detected key event to a corresponding pre-assigned scan code from the user profile of step 502, and then broadcast this assigned scan code to the VPS MCU 504. The VPS MCU 504 then maps the provided scan code to the applicable macro information pre-assigned in step 503 and broadcasts this assigned macro information in step 505 to the particular user application 408 (e.g., game, word processing application, etc.).

For a previously pressed analog key 204 in which a reduced pressure level is subsequently detected by VPS MCU 290, the following methodology may be implemented in one exemplary embodiment to distinguish if a user's finger has been completely released from the key, or if the user's finger is still applying pressure to the key but at a reduced pressure level. This methodology may be so implemented to prevent incorrectly reading the complete release of a user's finger from an analog key 204 as a reduced pressure level value. Using this exemplary methodology, history of the most recent previous analog output signal 194 pressure level signal received from each of analog keys 204 is maintained by VPS MCU 290. In this regard, whenever analog output signal 194 indicates that a current pressure level being applied to a given analog key 204 is pre-empted (or changed) to a new pressure level, the current pressure level value for the given key 204 is first saved by VPS MCU 290 as a "previous level" value. Next, VPS MCU 290 checks to determine if the received new pressure level value for the given key 204 is lower than the saved "previous level" value for the same key. If the VPS MCU 290 determines that the received new pressure level value for the given key 204 is lower than the saved "previous level" value for the same key 204, VPS MCU 290 then may delay or wait for a predetermined number of MCU clock cycles (e.g., about 300 microseconds or other suitable time), before then again sampling the analog output signal 194 from the same given analog key 204 to determine if the given key 204 is active, i.e., is still being pressed. If the given key 204 is still being pressed, VPS MCU 290 processes the new pressure level value of analog output signal 194 in the manner previously described herein in relation to FIGS. 1-5. However, if VPS MCU 290 finds that the resampled analog output signal 194 indicates that the given key 204 is now idle (i.e., no longer pressed), VPS MCU 290 resets the history of the previous pressure level value for the given key 204 and ignores the new pressure level value as erroneous data.

Following is an example of three outcomes that may be realized for a given sensor using the preceding methodology, it being understood that this disclosed methodology may be applied to any type of variable pressure sensor implemented using the disclosed systems and methods, i.e., in addition to variable pressure keys 204.

1. Assume the current VPS pressure level value for a given sensor is 2, and then pre-empted by a new pressure level value. VPS MCU 290 then delays and resamples the given sensor. If the resampled new pressure level for the given sensor is found to be 3, VPS MCU 290 processes level 3 as the new pressure level value being applied to the given sensor.

2. Assume the current VPS pressure level value for a given sensor is 2, and then pre-empted by a new pressure level value. VPS MCU 290 then delays and resamples the given sensor. If the resampled new pressure level for the given sensor is found to be 1, VPS MCU 290 processes level 1 as the new pressure level value being applied to the given sensor 3. Assume the current VPS pressure level value for a given sensor is 2, and then pre-empted by a lower pressure level value. VPS MCU 290 then delays and resamples the given sensor. If the given sensor is found to be no longer active when resampled, VPS MCU 290 does nothing, maintains the previous pressure level value in memory, and ignores the new pressure level value.

It will be understood that the number and sequence of steps of FIG. 5 is exemplary only, and that any other combination of number of additional, fewer, and/or alternated steps may be employed that is suitable for implementing one or more individual pressure sensitive keys that each support multiple native scan codes, with each scan code corresponding to a unique pressure level output, and that is capable of outputting different assigned macro information (e.g., multi-key sequence including user-assigned scan codes) per key pressure level sensed from individual pressure sensitive keys.

It will be understood that one or more of the tasks, functions, or methodologies described herein (e.g., including those described herein for components 290, 407, 405, 354, 403, 404, etc.) may be implemented, for example, as software, firmware or other computer program of instructions embodied in a non-transitory tangible computer readable medium that is executed by a CPU, controller, microcontroller, processor, microprocessor, FPGA, ASIC, or other suitable processing device or combination of such processing devices.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. Variable pressure sensor processing system, comprising at least two processing devices configured as a multiple macro information creation component coupled to receive an analog output signal from each given one of one or more pressure sensitive sensors that is representative of pressure applied to the given sensor, and where the multiple macro information creation component comprises:

at least a first processing device configured to:

detect an identity of a given one of the pressure sensitive sensors to which pressure is being applied based on a received one of the analog output signals, detect a level of pressure applied to the given one of the pressure sensitive sensors based on the received one of the analog output signals, and provide a key code that corresponds to the detected combination of sensor identity and pressure level currently applied to the given one of the pressure sensitive sensors; and at least a second processing device configured to receive the provided key code using an operating system (OS) in-box driver, and to select and produce a given macro information based on the received key code that corresponds to the detected combination of sensor identity and pressure level currently applied to the given one of the pressure sensitive sensors.

2. The system of claim 1, where the second processing device is further configured to implement a variable pressure sensor (VPS) macro configuration component coupled to provide a VPS configuration profile to the multiple macro information creation component, the VPS configuration profile specifying a correlation of different macro information to each of one or more given pressure levels applied to the given one of the pressure sensitive sensors.

3. The system of claim 2, where the second processing device is further configured to implement the VPS macro configuration component to accept input from a user to assign different macro information for the VPS configuration profile corresponding to each of one or more given pressure levels applied to the given one of the pressure sensitive sensors.

4. The system of claim 1, where:
the first processing device is configured as pressure sensing digital output circuitry coupled to receive the analog output signal from each given one of the pressure sensitive sensors, the pressure-sensing digital output circuitry being configured to:
detect an identity of a given one of the pressure sensitive sensors to which pressure is being applied based on a received one of the analog output signals,
detect a level of pressure applied to the given one of the pressure sensitive sensors based on the received one of the analog output signals, and
provide given pressure-based key code information that corresponds to the detected combination of sensor identity and pressure level applied to the given one of the pressure sensitive sensors; and
the second processing device is coupled to receive the given pressure-based key code information from the first processing device and is configured as a variable pressure sensor (VPS) macro selector component, the VPS macro selector component being configured to select and produce the given macro information that corresponds to the given pressure-based key code information.

5. The system of claim 4, where the first processing device is coupled to the one or more pressure sensitive sensors; where the second processing device comprises a central processing unit (CPU) of an information handling system that is configured to execute at least one OS; and where the VPS macro selector component is configured to provide the given macro information that corresponds to the given pressure key code information to a user application executing on the CPU.

6. The system of claim 4, where the one or more pressure sensitive sensors comprise pressure sensitive keys; where the first processing device is coupled to a keyboard that comprises the one or more pressure sensitive keys; where the second processing device comprises a central processing unit (CPU) of an information handling system; and where the VPS macro selector component is configured to provide the given macro information that corresponds to the given pressure-based key code information to at least one user application executing on the CPU.

7. The system of claim 1, where the second processing device of the multiple macro information creation component is configured to select and produce the given macro information comprising a multiple key sequence corresponding to the given pressure-based scan code key code information.

8. The system of claim 1, where the second processing device of the multiple macro information creation component is further configured to select and produce a given single momentary-on key code corresponding to the detected combination of sensor identity and pressure level applied to a given one of the pressure sensitive sensors.

9. The system of claim 1, where the first processing device is a variable pressure sensor (VPS) controller; and where the second processing device is a host central processing unit (CPU) configured to execute at least one OS.

10. The system of claim 1, where the OS in-box driver is a native USB Human Interface Device (HID) driver.

11. The system of claim 1, where the provided key code is a stored pre-assigned unique key code that has been previously assigned to a given combination of sensor identity and pressure level that will be detected in the future and that is stored with other pre-assigned unique key codes that are each assigned to other combinations of sensor identity and pressure level that will be detected in the future; and where the first processing device is configured to select and retrieve the stored pre-assigned unique key code that corresponds to the current detected combination of sensor identity and pressure level currently being applied to the given one of the pressure sensitive sensors.

12. An information handling system, comprising:
at least one processing device configured to execute a user application thereon;
keyboard circuitry comprising one or more pressure sensitive keys configured to provide analog output signals corresponding to each given one of the pressure sensitive keys that is representative of pressure applied to the given key; and
at least two processing devices configured as multiple macro information creation component coupled to receive the analog output signal from each given one of the pressure sensitive keys;
where the multiple macro information creation component comprises at least one first processing device configured to:
detect an identity of a given one of the pressure sensitive keys to which pressure is being applied based on a received one of the analog output signals,
detect a level of pressure applied to the given one of the pressure sensitive keys based on the received one of the analog output signals, and
provide a key code that corresponds to the detected combination of sensor identity and pressure level currently applied to the given one of the pressure sensitive sensors; and
where the multiple macro information creation component further comprises at least one second processing device configured to:
receive the provided key code using an operating system (OS) in-box driver,
select and produce a given macro information based on the received key code that corresponds to the detected combination of key identity and pressure level currently applied to the given one of the pressure sensitive keys, and provide the given macro information to the at least one user application.

13. The system of claim 12, where the first processing device is coupled to the keyboard circuitry; where the user application is configured to execute on the second processing device that is coupled to the first processing device, the second processing device being configured as a central processing unit (CPU) for the information handling system; and where the multiple macro information creation component is configured to provide the given macro information that corresponds to the given pressure-based key code information to the at least one user application executing on the CPU.

14. The system of claim 12, where the second processing device is further configured as a variable pressure sensor (VPS) macro configuration component coupled to provide a VPS configuration profile to the multiple macro information creation component, the VPS configuration profile specifying a correlation of different macro information to each of one or more given pressure levels applied to the given one of the pressure sensitive keys; and where the VPS macro configuration component is further configured to accept input from a user to assign different macro information corresponding to each of one or more given pressure levels applied to the given one of the pressure sensitive keys.

15. The system of claim 12, where:
the first processing device is configured as pressure sensing digital output circuitry coupled to receive the analog output signal from each given one of the pressure sensitive keys, the pressure-sensing digital output circuitry being configured to:
detect an identity of a given one of the pressure sensitive keys to which pressure is being applied based on a received one of the analog output signals,
detect a level of pressure applied to the given one of the pressure sensitive keys based on the received one of the analog output signals, and
provide given pressure-based key code information that corresponds to the detected combination of key identity and pressure level applied to the given one of the pressure sensitive keys; and
the second processing device is coupled to receive the given pressure-based key code information from the first processing device and is configured as a variable pressure sensor (VPS) macro selector component, the VPS macro selector component being configured to:
select and produce the given macro information that corresponds to the given pressure-based key code information, and
provide the given macro information to the at least one user application.

16. The system of claim 15, where the first processing device is coupled to a keyboard that comprises the one or more pressure sensitive keys; where the VPS macro selector component is configured to execute with the user application on the second processing device; where the second processing device comprises a central processing unit (CPU) of the information handling system; where the VPS macro selector component is configured to provide the given macro information that corresponds to the given pressure-based key code information to the user application executing on the CPU.

17. The system of claim 12, where the keyboard circuitry further comprises:
a plurality of digital keys, each of the digital keys being coupled to provide a single open/short digital output signal each time the digital key is pressed by a user; and momentary-on key signal generation circuitry comprising at least one processing device configured to receive the single open/short digital output signal from each of the plurality of digital keys, the momentary-on key signal generation circuitry configured to produce a corresponding keyboard event signal to the user application executing on the processing device of the information handling system.

18. The system of claim 12, where the first processing device is a variable pressure sensor (VPS) controller; and where the second processing device is a host central processing unit (CPU) configured to execute at least one OS.

19. The system of claim 12, where the OS in-box driver is a native USB Human Interface Device (HID) driver.

20. The system of claim 12, where the provided key code is a stored pre-assigned unique key code that has been previously assigned to a given combination of sensor identity and pressure level that will be detected in the future and that is stored with other pre-assigned unique key codes that are each assigned to other combinations of sensor identity and pressure level that will be detected in the future; and where the first processing device is configured to select and retrieve the stored pre-assigned unique key code that corresponds to the current detected combination of sensor identity and pressure level currently being applied to the given one of the pressure sensitive sensors.

21. A method of accepting input from one or more variable pressure sensors, comprising:
providing one or more pressure sensitive sensors;
producing an analog output signal for each given one of the pressure sensitive sensors when depressed by a user, the analog output signals being representative of pressure applied to the given pressure sensitive sensor by the user;
providing one or more variable pressure sensor processing components comprising at least two processing devices configured as multiple macro information creation component;
receiving the analog output signal in at least a first processing device of the variable pressure sensor processing components from each given one of one or more pressure sensitive sensors that is representative of pressure applied to the given sensor; and
using the first processing device of the variable pressure sensor processing components to perform the following steps:
detecting an identity of a given one of the pressure sensitive sensors to which pressure is being applied based on a received one of the analog output signals,
detecting a level of pressure applied to the given one of the pressure sensitive sensors based on the received one of the analog output signals, and
providing a key code that corresponds to the detected combination of sensor identity and pressure level currently applied to the given one of the pressure sensitive sensors; and
using at least a second processing device of the variable pressure sensor processing components to perform the following steps:
receiving the provided key code using an operating system (OS) in-box driver, and
selecting and producing a given macro information based on the received key code that corresponds to the detected combination of sensor identity and pressure level currently applied to the given one of the pressure sensitive sensors.

22. The method of claim 21, where the second processing device is configured as a variable pressure sensor (VPS) macro configuration component; and where the method further comprises:

providing a VPS configuration profile to the multiple macro information creation component, the VPS configuration profile specifying a correlation of different macro information to each of one or more given pressure levels applied to the given one of the pressure sensitive sensors; and using the VPS macro configuration component to accept input from a user to assign different macro information for the VPS configuration profile corresponding to each of one or more given pressure levels applied to the given one of the pressure sensitive sensors.

23. The method of claim 21, where the first processing device is configured as pressure sensing digital output circuitry; where the second processing device is configured as a variable pressure sensor (VPS) macro selector component; and where the method further comprises:

receiving the analog output signal in the pressure sensing digital output circuitry from each given one of the pressure sensitive sensors; and using the pressure-sensing digital output circuitry to perform the following steps:
  detecting an identity of a given one of the pressure sensitive sensors to which pressure is being applied based on a received one of the analog output signals,
  detecting a level of pressure applied to the given one of the pressure sensitive sensors based on the received one of the analog output signals, and
  providing given pressure-based key code information to the VPS macro selector component that corresponds to the detected combination of sensor identity and pressure level applied to the given one of the pressure sensitive sensors; and using the VPS macro selector component to select and produce given macro information that corresponds to the given pressure-based key code information.

24. The method of claim 23, where the pressure sensing digital output circuitry is coupled to the one or more pressure sensitive sensors; where the second processing device comprises a central processing unit (CPU) of an information handling system; and where the method further comprises using the VPS macro selector component to provide the given macro information that corresponds to the given pressure-based key code information to a user application executing on the CPU.

25. The method of claim 24, where the one or more pressure sensitive sensors comprise pressure sensitive keys; where the first processing device is coupled to a keyboard that comprises the one or more pressure sensitive keys; where the second processing device comprises a central processing unit (CPU) of an information handling system; and where the method further comprises using the VPS macro selector component to provide the given macro information that corresponds to the given pressure-based key code information to at least one user application executing on the CPU.

26. The method of claim 21, further comprising using the second processing device of the multiple macro information creation component to select and produce the given macro information comprising a multiple key sequence corresponding to the given pressure-based key code information.

27. The method of claim 21, further comprising using the second processing device of the multiple macro information creation component to select and produce a given single momentary-on key code corresponding to the detected combination of sensor identity and pressure level applied to a given one of the pressure sensitive sensors.

28. The method of claim 21, further comprising:
  providing a plurality of digital keys, each of the digital keys being coupled to provide a single open/short digital output signal each time the digital key is pressed by a user; and
  providing momentary-on key signal generation circuitry comprising at least one processing device configured to receive the single open/short digital output signal from each of the plurality of digital keys; and
  using the momentary-on key signal generation circuitry to produce a corresponding keyboard event signal to a user application executing on the second processing device.

29. The method of claim 21, where the first processing device is a variable pressure sensor (VPS) controller; and where the second processing device is a host central processing unit (CPU) configured to execute at least one OS.

30. The method of claim 21, where the OS in-box driver is a native USB Human Interface Device (HID) driver.

31. The method of claim 21, where the provided key code is a stored pre-assigned unique key code that has been previously assigned to a given combination of sensor identity and pressure level that will be detected in the future and that is stored with other pre-assigned unique key codes that are each assigned to other combinations of sensor identity and pressure level that will be detected in the future; and where the method further comprises using the first processing device to select and retrieve the pre-assigned unique key code that corresponds to the current detected combination of sensor identity and pressure level currently being applied to the given one of the pressure sensitive sensors.

* * * * *